(12) United States Patent
Ylitalo

(10) Patent No.: US 7,171,241 B2
(45) Date of Patent: Jan. 30, 2007

(54) DATA TRANSMISSION METHOD AND ARRANGEMENT

(75) Inventor: Juha Ylitalo, Oulu (FI)

(73) Assignee: Nokia Corporation, Espoo (FI)

( * ) Notice: Subject to any disclaimer, the term of this patent is extended or adjusted under 35 U.S.C. 154(b) by 250 days.

(21) Appl. No.: 10/712,255

(22) Filed: Nov. 14, 2003

(65) Prior Publication Data

US 2004/0106437 A1     Jun. 3, 2004

Related U.S. Application Data

(63) Continuation of application No. PCT/FI01/00471, filed on May 15, 2001.

(51) Int. Cl.
   *H04M 1/00*     (2006.01)

(52) U.S. Cl. .................. 455/562.1; 455/424

(58) Field of Classification Search ........... 455/562.1, 455/121, 446, 423, 562, 63.1, 424; 342/375, 342/373, 372; 375/347; 370/342
   See application file for complete search history.

(56) References Cited

U.S. PATENT DOCUMENTS

| | | | |
|---|---|---|---|
| 5,365,187 A * | 11/1994 | Hornak et al. ............... 330/10 |
| 5,396,256 A * | 3/1995 | Chiba et al. ............... 342/372 |
| 5,585,803 A * | 12/1996 | Miura et al. ............... 342/372 |
| 5,745,858 A * | 4/1998 | Sato et al. ............... 455/562.1 |
| 5,754,950 A * | 5/1998 | Petersson et al. ........... 455/273 |
| 5,771,439 A * | 6/1998 | Kennedy et al. ............ 455/63.1 |
| 5,894,473 A * | 4/1999 | Dent ......................... 370/342 |
| 5,933,466 A * | 8/1999 | Oshima et al. ............. 375/347 |
| 5,960,349 A * | 9/1999 | Chheda et al. ............. 455/446 |
| 5,987,320 A * | 11/1999 | Bobick ....................... 455/423 |
| 6,005,516 A * | 12/1999 | Reudink et al. ............ 342/375 |
| 6,021,329 A * | 2/2000 | Kornestedt et al. ......... 455/446 |
| 6,094,165 A * | 7/2000 | Smith .......................... 342/373 |
| 6,331,837 B1 * | 12/2001 | Shattil ....................... 342/378 |
| 6,369,758 B1 * | 4/2002 | Zhang ....................... 342/383 |
| 6,577,879 B1 * | 6/2003 | Hagerman et al. ........ 455/562.1 |
| 6,782,255 B1 * | 8/2004 | Ranta et al. ................ 455/423 |
| 2001/0016504 A1 * | 8/2001 | Dam et al. ................ 455/562 |
| 2002/0042290 A1 * | 4/2002 | Williams et al. ............ 455/562 |
| 2002/0137547 A1 * | 9/2002 | Judson ....................... 455/562 |
| 2004/0029538 A1 * | 2/2004 | Holma et al. ............... 455/121 |

FOREIGN PATENT DOCUMENTS

GB      2 320 618 A      6/1998

* cited by examiner

*Primary Examiner*—Duc M. Nguyen
*Assistant Examiner*—Chuck Huynh
(74) *Attorney, Agent, or Firm*—Squire, Sanders & Dempsey, LLP.

(57) ABSTRACT

A method for determining weight factors of antenna beams, the method comprising using at least one directional antenna beam implemented with an antenna array to establish a radio link, forming a radio cell with the antenna beam, dividing the radio cell into at least two different cells by dividing the antenna beam, selecting weight factors of antenna elements of the antenna array such that the antenna element specific sums of weight factors of a radio cell formed with the antenna array and corresponding weight factors of at least one, second radio cell formed with the same antenna array are at least substantially equal within predetermined limits in order to achieve a predetermined power balance between different antenna elements.

33 Claims, 6 Drawing Sheets

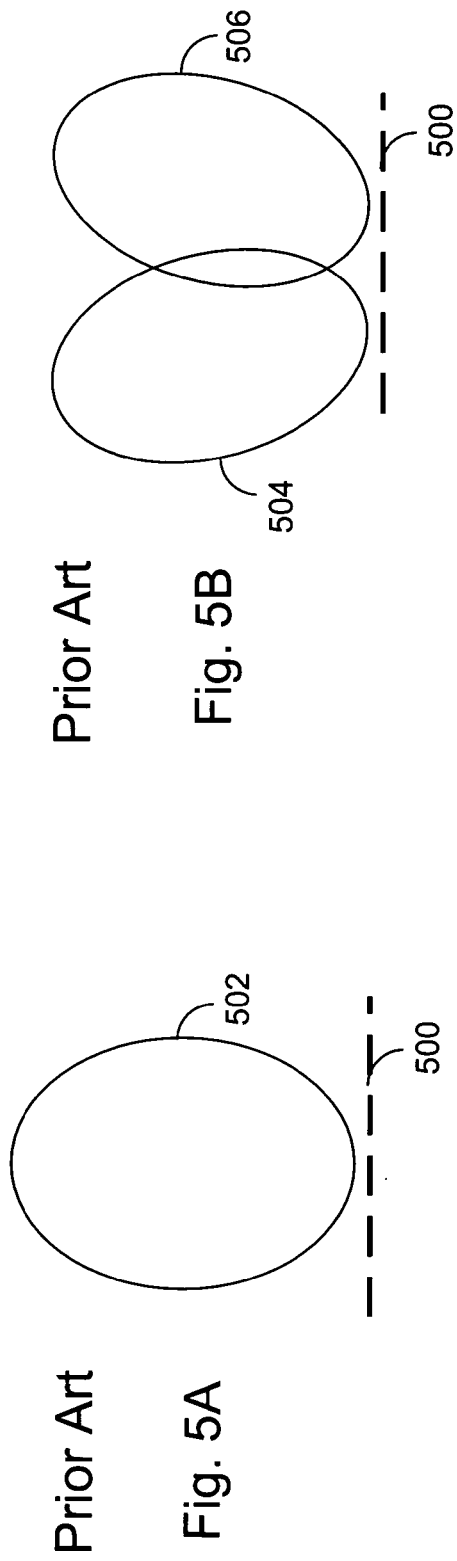
Prior Art
Fig. 5A
Prior Art
Fig. 5B
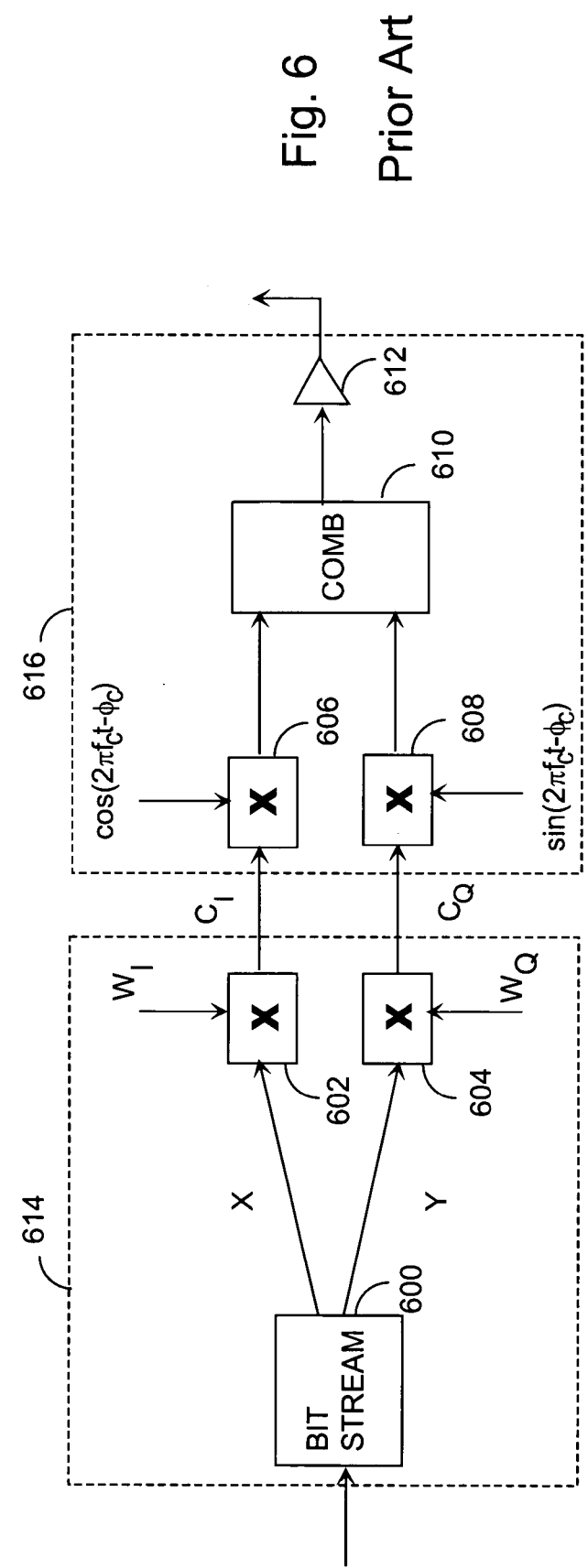
Fig. 6
Prior Art

DATA TRANSMISSION METHOD AND ARRANGEMENT

This application is a continuation of international application PCT/FI01/00471 filed 15 May 2001 which designated the US and was published under PCT article 21(2) in English.

FIELD OF THE INVENTION

The invention relates to a method and an arrangement for determining weight factors of directional antenna beams. To establish a radio link, the method employs at least one directional antenna beam implemented with an antenna array.

BACKGROUND OF THE INVENTION

When adaptive antenna arrays are used, the basic principle ist that radiation beams are narrow and they are directed as directly as possible at a desired receiver. Widely known methods of using adaptive antenna arrays can be divided into two main groups: radiation beams are directed at a receiver, or the most suitable beam is selected from various alternative beams. For a downlink transmission, a suitable beam is selected or the beam is turned on the basis of information obtained from the uplink. The reuse of frequencies can be made more efficient and the power of transmitters can be reduced, because, owing to the directivity of antenna beams, interference with other users diminishes.

In a digital system, the directing of antenna beams in the up-link is implemented by dividing a signal in baseband parts into I and Q branches and by multiplying in a complex manner (phase and amplitude) the signal of each antenna element by appropriate weighting coefficients, and then by summing up the output signals of all antenna elements. In this case, an adaptive antenna array comprises not only antennas but also a signal processor, which automatically adapts antenna beams by using a control algorithm so that in the downlink, it turns the antenna beams to a direction in which the strongest signal is measured in the uplink. The directivity of beams can also be implemented analogically by using fixed phasing circuits (Butler matrix) for generating orthogonal radiation beams in which the phase changes linearly antenna by antenna. The Bulter matrix is used to measure which beam receives most signal energy, i.e. in which beam the signal is the strongest, and this beam is selected for the transmission.

However, it is not always sufficient that a user-specific antenna beam is used for monitoring the location of the user as precisely as possible. Namely, the problem is that the number of those needing radio resources varies in the coverage area. A radio cell, where the number of those needing services can usually be covered, can temporarily become a so-called hot spot area with a lot of users in a relatively small area. To solve this problem, it has been suggested that an antenna beam, i.e. sector, formed with a fixed Bulter matrix is split into two beams. The method allows the operator to change azimuth angles by a step of 30 degrees, since 4 orthogonal beams, each having a coverage area of about 30 degrees, can typically be generated with a 4×4 Butler matrix. The method is called sector synthesis.

A problem with fixed-beam systems is, however, how to design power amplifiers, because, in the worst case, each power amplifier of an antenna array has different designs, which causes costs during planning and implementation phases. In digital beam forming, the problem with an attempt to have a power balance between different antenna elements is that compromises have to be made in order to optimize the width and side-lobe levels of antenna beams.

BRIEF DESCRIPTION OF THE INVENTION

It is thus an object of the invention to provide an improved method for determining weight factors of directional antenna beams.

This is achieved by a method for determining weight factors of antenna beams, the method comprising using at least one directional antenna beam implemented with an antenna array to establish a radio link and forming a radio cell with the antenna beam, dividing the radio cell into at least two different cells by dividing the antenna beam, selecting weight factors of antenna elements of the antenna array such that the antenna element specific sums of weight factors of a radio cell formed with the antenna array and corresponding weight factors of at least one, second radio cell formed with the same antenna array are at least substantially equal within predetermined limits in order to achieve a predetermined power balance between different antenna elements.

The invention also relates to a method for determining weight factors of antenna beams, the method comprising using at least one directional antenna beam implemented with an antenna array to establish a radio link, dividing the antenna beam into at least two user-specific beams, selecting weight factors of antenna elements of the antenna array such that the antenna element specific sums of weight factors of antenna elements of a user-specific beam and corresponding weight factors of other user-specific beams formed with the same antenna array are at least substantially equal within predetermined limits in order to achieve a predetermined power balance between different antenna elements.

The invention also relates to a method for determining weight factors of antenna beams, the method comprising using at least one directional antenna beam implemented with an antenna array to establish a radio link and forming a radio cell with the antenna beam, dividing the radio cell into at least two different cells by dividing the antenna beam, dividing at least one antenna beam forming a radio cell into at least two user-specific beams, selecting weight factors of antenna elements of the antenna array such that the antenna element specific sums of corresponding weight factors of beams formed with the same antenna array are at least substantially equal within predetermined limits in order to achieve a predetermined power balance between different antenna elements.

The invention also relates to a transmitter for determining weight factors of antenna beams, in which arrangement at least one directional antenna beam implemented with an antenna array is used to establish a radio link and a radio cell is formed with the antenna beam, comprising means for dividing the radio cell into at least two cells by dividing the antenna beam, means for selecting weight factors of antenna elements of the antenna array such that the antenna element specific sums of weight factors of a radio cell formed with the antenna array and corresponding weight factors of at least one, second radio cell formed with the same antenna array are at least substantially equal within predetermined limits in order to achieve a predetermined power balance between different antenna elements.

The invention also relates to a transmitter for determining weight factors of antenna beams, in which arrangement at least one directional antenna beam implemented with an antenna array is used to establish a radio link., comprising means for dividing the antenna beam into at least two user-specific beams, means for selecting weight factors of antenna elements of the antenna array such that the antenna element specific sums of weight factors of antenna elements of a user-specific beam and corresponding weight factors of other user-specific beams formed with the same antenna array are at least substantially equal within predetermined limits in order to achieve a predetermined power balance between different antenna elements.

The invention also relates to a transmitter for determining weight factors of antenna beams, in which arrangement at least one directional antenna beam implemented with an antenna array is used to establish a radio link and a radio cell is formed with the antenna beam, comprising means for dividing the radio cell into at least two different cells by dividing the antenna beam, means for dividing the antenna beam forming a radio cell into at least two user-specific beams, the transmitter comprises means for selecting weight factors of antenna elements of the antenna array such that the antenna element specific sums of corresponding weight factors of beams formed with the same antenna array are at least substantially equal within predetermined limits in order to achieve a predetermined power balance between different antenna elements.

The invention also relates to a transmitter for determining weight factors of antenna beams, in which arrangement at least one directional antenna beam implemented with an antenna array is used to establish a radio link and a radio cell is formed with the antenna beam, comprising dividing means dividing the radio cell into at least two cells by dividing the antenna beam, selecting means selecting weight factors of antenna elements of the antenna array such that the antenna element specific sums of weight factors of a radio cell formed with the antenna array and corresponding weight factors of at least one, second radio cell formed with the same antenna array are at least substantially equal within predetermined limits in order to achieve a predetermined power balance between different antenna elements.

The invention also relates to a transmitter for determining weight factors of antenna beams, in which arrangement at least one directional antenna beam implemented with an antenna array is used to establish a radio link, comprising dividing means dividing the antenna beam into at least two user-specific beams, selecting means selecting weight factors of antenna elements of the antenna array such that the antenna element specific sums of weight factors of antenna elements of a user-specific beam and corresponding weight factors of other user-specific beams formed with the same antenna array are at least substantially equal within predetermined limits in order to achieve a predetermined power balance between different antenna elements.

The invention also relates to a transmitter for determining weight factors of antenna beams, in which arrangement at least one directional antenna beam implemented with an antenna array is used to establish a radio link and a radio cell is formed with the antenna beam, comprising first dividing means dividing the radio cell into at least two different cells by dividing the antenna beam, second dividing means dividing the antenna beam forming a radio cell into at least two user-specific beams, selecting means selecting weight factors of antenna elements of the antenna array such that the antenna element specific sums of corresponding weight factors of beams formed with the same antenna array are at least substantially equal within predetermined limits in order to achieve a predetermined power balance between different antenna elements.

The preferred embodiments of the invention are disclosed in the dependent claims.

The invention is based on dividing an antenna beam (or a cell formed with the beam) into two or more parts, selecting weight factors of antenna elements of an antenna array such that the antenna element specific sums of weight factors of the antenna elements and corresponding weight factors of a second, at least one beam formed with the same antenna array (or cell formed with the beam) are equal or substantially equal within limits set by the objects of radio network planning in order to achieve a predetermined power balance between different antenna elements. By using the weight factors, the powers of different antenna elements of the antenna array can be set to be completely equal or to slightly differ from each other, if this is required by the set radio planning objects, such as desired beam directivity or crosstalk minimization.

The method and system of the invention provide a plurality of advantages. By employing the method of the invention, a desired power balance between different antenna elements of an antenna array is achieved without having to make too narrow antenna beams. The method provides a better isolation between different cells, which means lower side-lobe levels. In addition, the system allows inaccuracies in the weight factor determination, which means that it is not too sensitive to phase changes: it is even possible to have an inaccuracy of 5 degrees in the phase. The method also allows the formation of several radio cells by using the same antenna beam.

BRIEF DESCRIPTION OF THE FIGURES

In the following, the invention will be described in greater detail in connection with preferred embodiments, with reference to the attached drawings, in which:

FIGS. 5a to 5b illustrate an example of cell splitting,

FIG. 6 shows an example of digital baseband beam forming,

DESCRIPTION OF THE EMBODIMENTS

The solution according to the invention is particularly applicable to a CDMA radio system using a direct sequence technique. Other applications may include satellite systems, military telecommunication systems and private non-cellular networks. However, the solution of the invention is not restricted to them.

Figure 1:
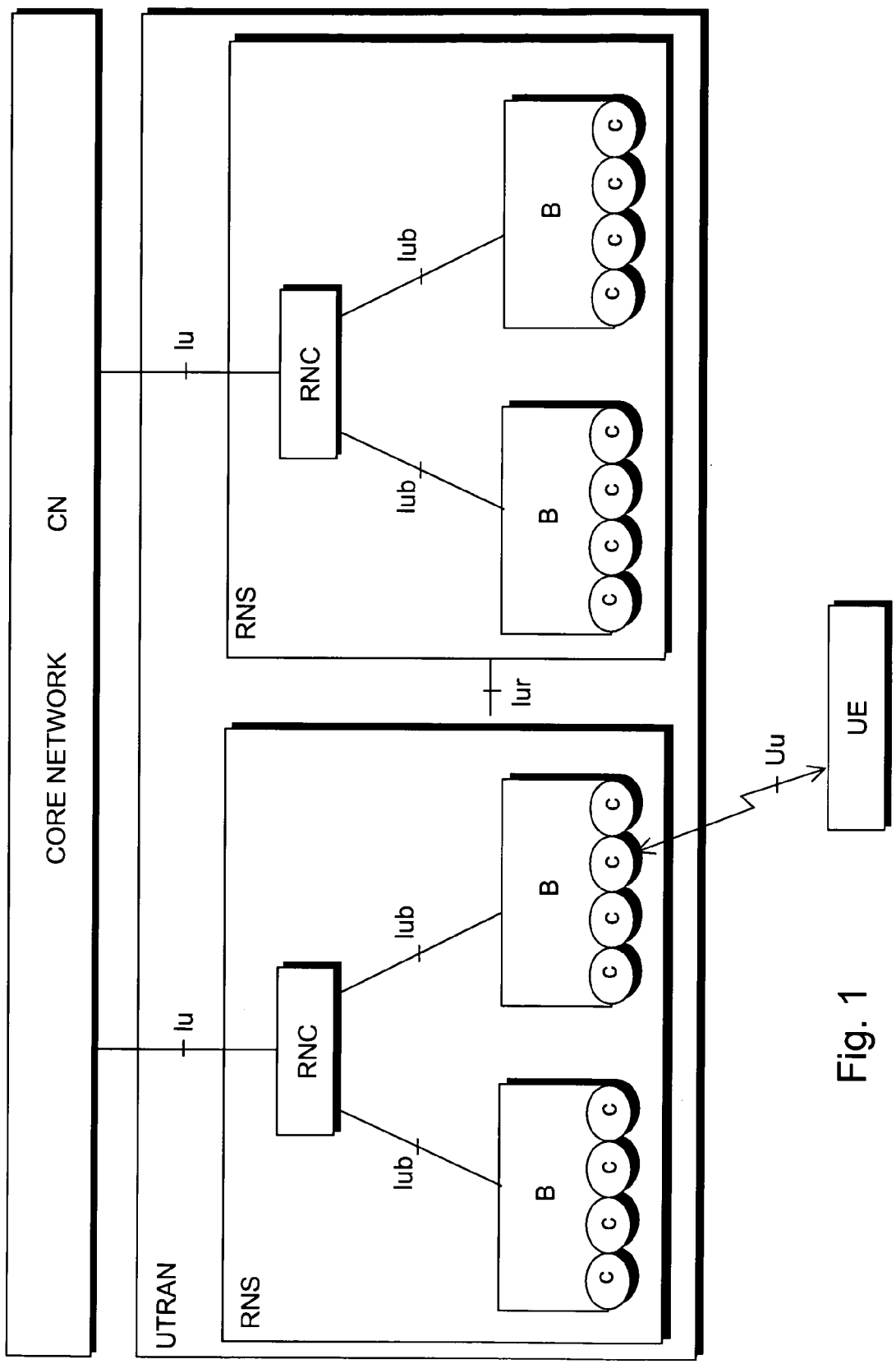
FIG. 1 shows an example of a telecommunication system.

With reference to FIG. 1, the structure of a mobile telephone system is explained by way of example. The main parts of the mobile telephone system are core network CN, universal terrestrial radio access network of the mobile telephone system UTRAN and user equipment UE. The interface between the CN and the UTRAN is called Iu and the air interface between the UTRAN and the UE is called Uu.

The UTRAN comprises radio network subsystems RNS. The interface between the RNSs is called Iur. The RNS comprises a radio network controller RNC and one or more nodes B. The interface between the RNC and B is called Iub. The coverage area, or cell, of the node B is marked with C in the figure.

Figure 2:
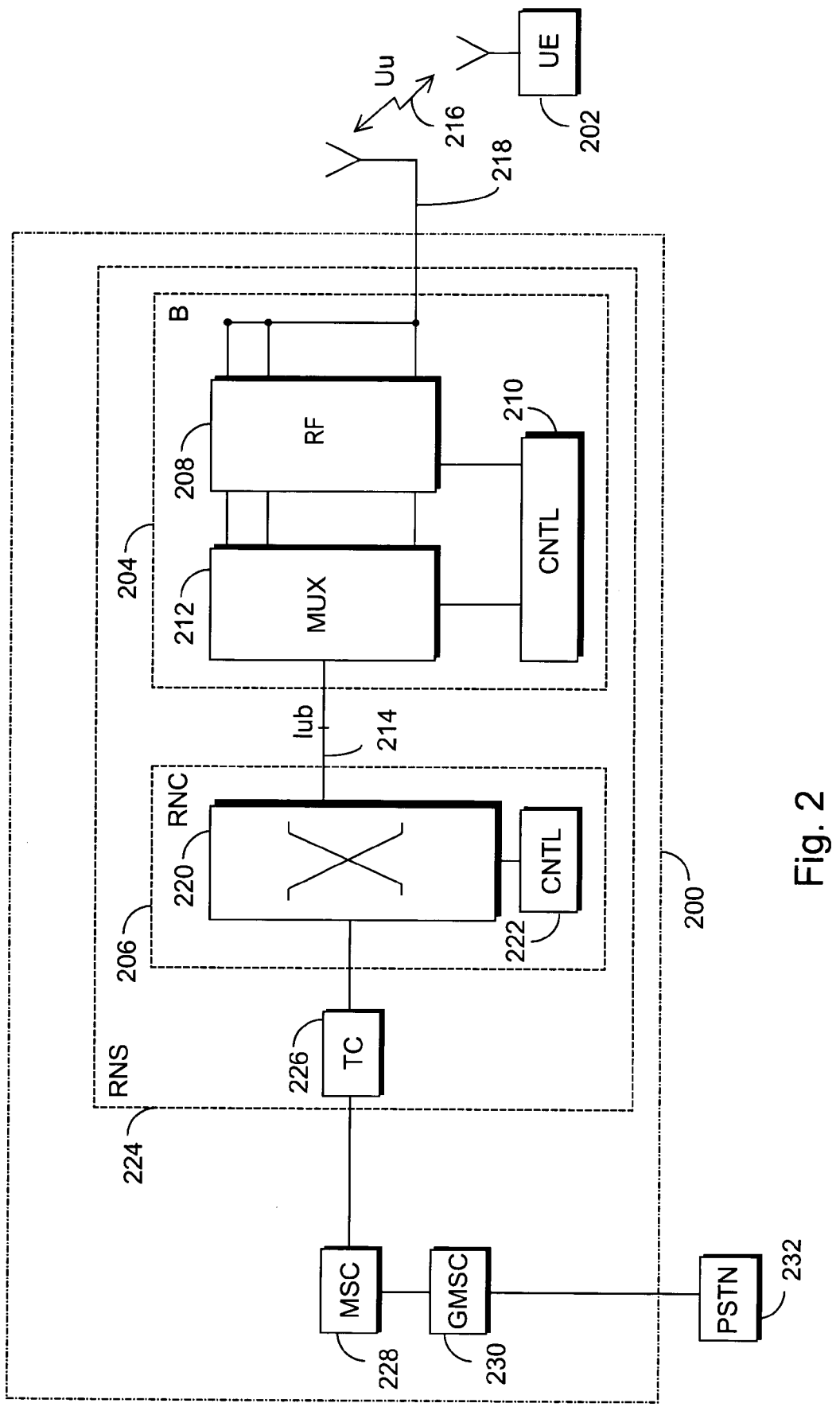
FIG. 2 shows another example of a telecommunication system.

The description of FIG. 1 is relatively general, and so a more specific example of a cellular radio system is shown in FIG. 2. FIG. 2 only includes the most essential blocks, but it is obvious to a person skilled in the art that the conventional cellular radio network also includes other functions and structures, which need not be further explained herein. The details of the cellular radio system can be different from what are shown in FIG. 2, but as to the invention, these differences are not relevant.

A cellular radio network thus typically comprises a fixed network infrastructure 200 and user equipment 202, which may be fixedly located, vehicle-mounted or portable terminals, such as mobile phones or portable computers, by which it is possible to have a connection with a radio communication system. The fixed network infrastructure 200 comprises network parts, such as base stations 204. A base station corresponds to the node B shown in the previous figure. A plural number of base stations 204 are, in turn, controlled in a centralised manner by a radio network controller 206 communicating with them. The base station 204 comprises radio-frequency parts 208 and a multiplexer unit 212. In the example of FIG. 2, the radio-frequency parts comprise both transmitter and receiver parts.

The base station 204 further comprises a control unit 210 which controls the operation of the radio-frequency parts 208 and the multiplexer 212. The multiplexer 212 arranges the traffic and control channels used by the radio-frequency parts 208 to a single transmission connection 214. The transmission connection 214 forms an interface Iub.

The radio-frequency parts 208 of the base station 204 are connected to an antenna unit 218 which is used for implementing a radio link 216 to the user equipment 202. The structure of the frames to be transmitted in the radio link 216 is defined separately in each system, the connection being referred to as an air interface Uu.

The radio network controller 206 comprises a group switching field 220 and a control unit 222. The group switching field 220 is used for connecting speech and data and for combining signalling circuits. The base station 204 and the radio network controller 206 form a radio network subsystem 224 which further comprises a transcoder 226. The transcoder 226 is usually located as close to a mobile services switching centre 228 as possible, because speech can then be transferred in a cellular radio network form between the transcoder 226 and the radio network controller 206, which saves transmission capacity.

The transcoder 226 converts different digital speech coding forms used between a public switched telephone network and a radio network to make them compatible, for instance from a fixed network form to another cellular radio network form, and vice versa. The control unit 222 performs call control, mobility management, collection of statistical data, signalling, and resource control and management.

FIG. 2 further shows the mobile services switching centre 228 and a gateway mobile services switching centre 230 which controls the connections from the mobile communications system to the outside world, in this case to a public switched telephone network 232.

Figure 3:
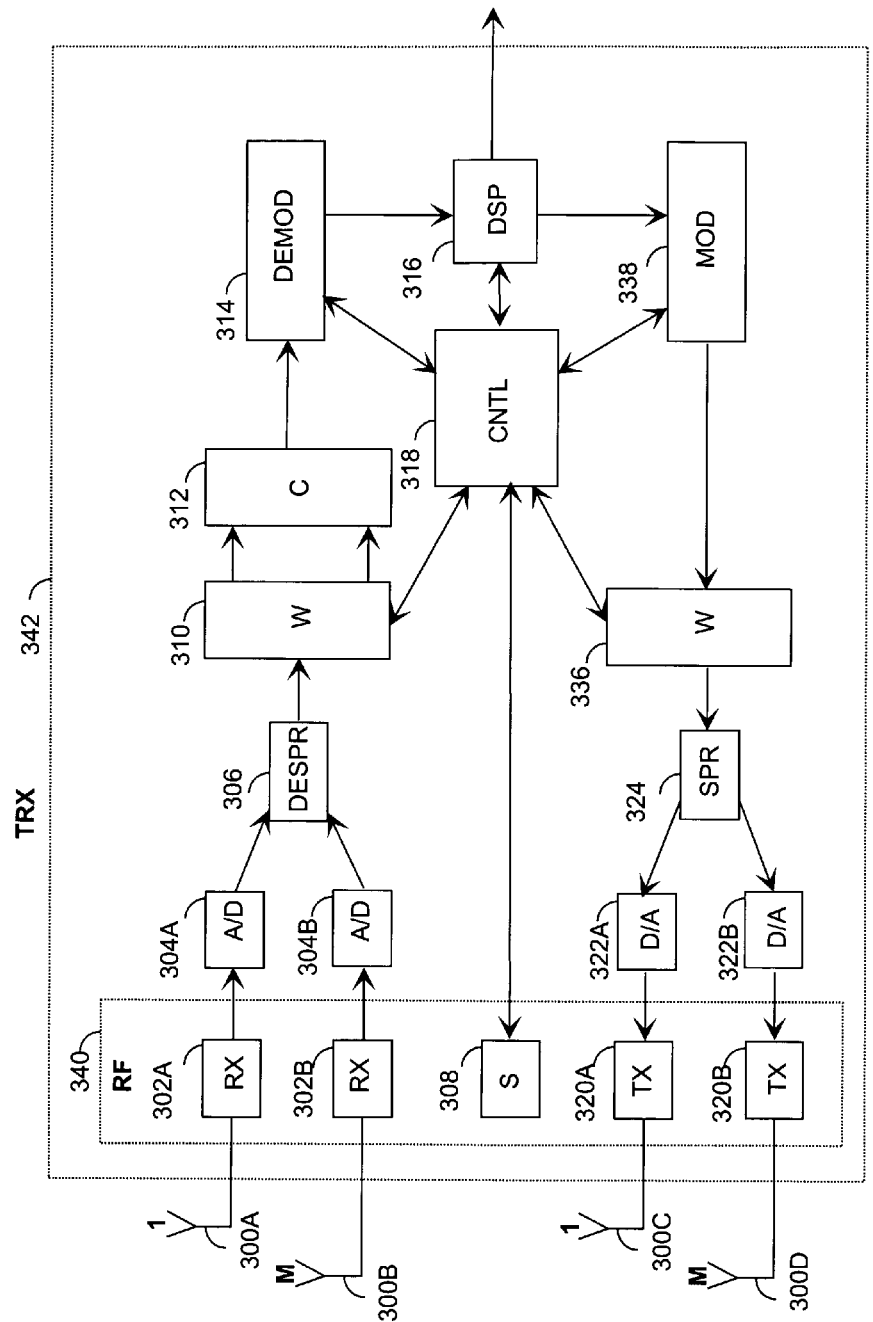
FIG. 3 shows an example of a transceiver.

FIG. 3 illustrates the structure of a transceiver part 342 of a base station in a cellular radio system in greater detail. An antenna array, which utilizes directional antenna beams, comprises various, e.g. eight, different elements 300A, 300B, which are used for directing an antenna beam at the receiving end. There can be M antenna elements, M being an integer greater than one. The same antenna elements can be used both for transmission and reception, or, as shown in FIG. 3, different antenna elements 300C, 300D are used for transmission. The antenna elements are arranged, for instance, linearly or planarly.

In the linear case, the elements can be arranged so as to form a ULA (Uniform Linear Array), where the elements are in a straight line at equal distances. In the planar case, a CA (Circular Array), for example, can be formed, where the elements are on the same plane forming a circle circumference in the horizontal direction. In this case a certain sector of the circle is covered, e.g. 120 degrees or even the full circle, i.e. 360 degrees. In principle, the above mentioned uniplanar antenna structures can also be implemented as two- or even three-dimensional structures. A two-dimensional structure is achieved, for example, by placing ULA structures next to one another, the elements thus forming a matrix. The antenna elements of the antenna array may also comprise several antenna units. For instance, in case of a matrix-form antenna, the antenna element may refer to a matrix column of the matrix-form antenna.

A multi-path propagated signal is received via the antenna elements. Each antenna element has receivers 302A, 302B of its own, which are radio-frequency parts 340.

The receiver 302 comprises a filter which prevents frequencies outside the desired frequency band. After this, the signal is converted into the intermediate frequency or directly into the baseband frequency, in which form the signal is sampled and quantizised in an analog/digital converter 304A, 304B. After the A/D conversion the signal is supplied to a despreading block 306, where spreading modulation is removed from the signal, i.e. the signal is converted into the narrowband form again.

The antenna pattern of the received signal is directed using digital phasing of the signal, and thus the antenna elements need not be mechanically directable. In this case, the direction of the user equipment 202 is expressed as a complex vector, which is formed from elementary units corresponding to antenna elements and usually expressed as complex numbers. Each separate signal is multiplied by the elementary unit of the antenna element in weighting means 310. After this, the signals can be combined in combining means 312.

Signal phasing can also be performed on a radio-frequency signal or on an intermediate-frequency signal, if such is used. In that case the weighting means 310 are located at the radio frequency parts 340 or between the radio frequency parts and the analog/digital converters 304A, 304B.

A demodulator 314 extracts the carrier wave effect from the received signal. A DSP block 316 performs digital signal processing, such as decoding and coding. The DSP block 316 can also determine weigh factors of antenna elements. A control unit 318 performs internal control functions by controlling different units.

In the transmission, a modulator 338 modulates digital signals to a radio-frequency carrier wave. In the weighting means 336 the signal is multiplied by the elementary units corresponding to the antenna elements. This allows the antenna beam to be directed towards the complex vector formed by the elementary units in digital phasing.

The signal to be transmitted is spread in block 324 into a broadband signal typically by multiplying the narrowband signal by a broadband spreading code. If the system is a narrowband one and applies code division multiple access, the spectrum of the signal is not spread to a broad band, but the purpose of multiplying by the code is only to distinguish the signals from each other in the receiver.

The signal is converted from the digital form into the analog form by a digital/analog converter 322A, 322B. Each signal component is transmitted to a transmitter 320A, 320B corresponding to the antenna element in question.

The transmitter comprises a filter for limiting the bandwidth. The transmitter also controls the output power of transmission. A synthesizer 308 provides the necessary carrier-wave frequencies for the different units. The clock included in the synthesizer can be controlled locally or centrally from somewhere else, e.g. from the radio network controller 206. The synthesizer generates the necessary frequencies by means of a voltage-controlled oscillator, for instance.

Figure 4:
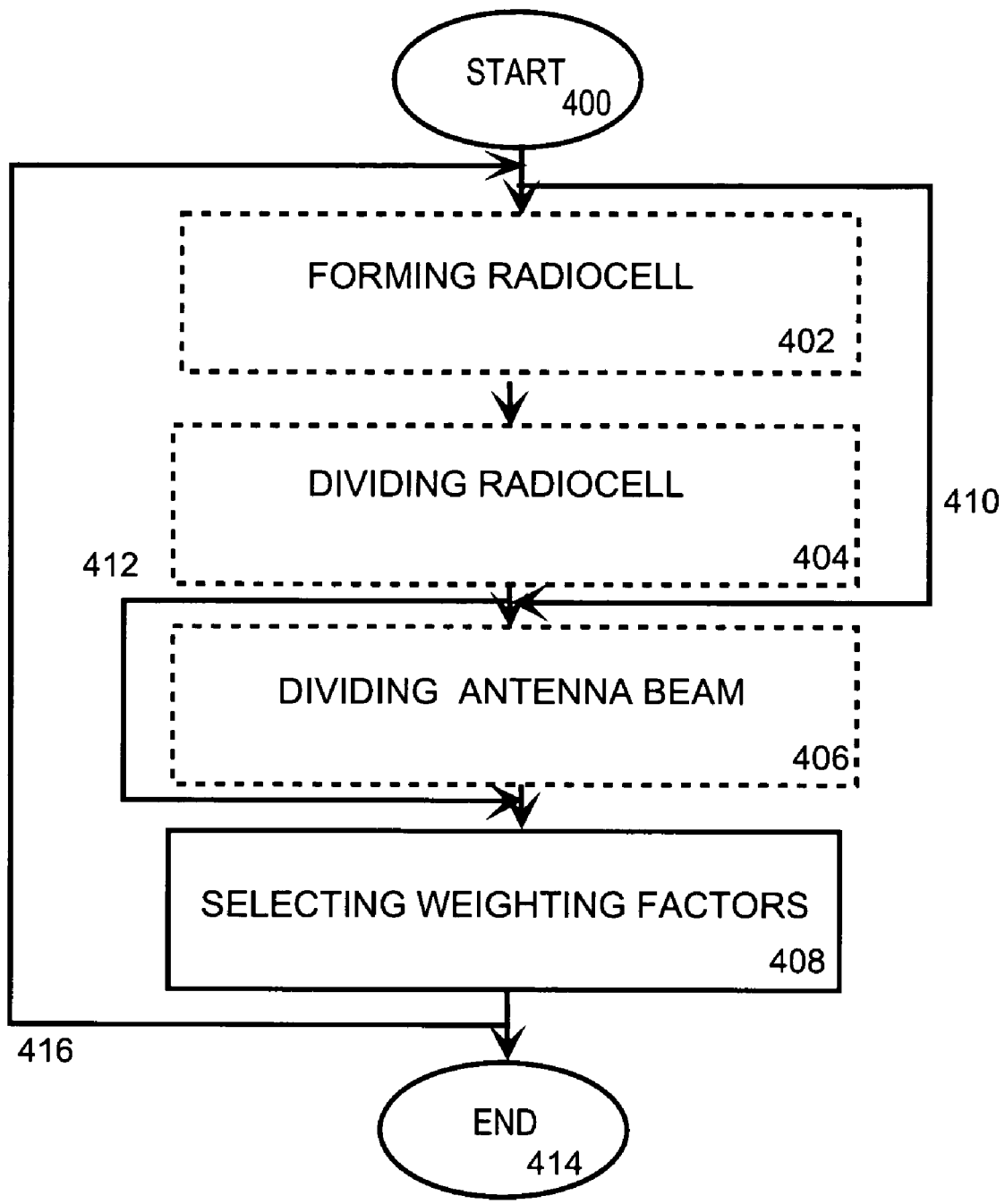
FIG. 4 shows method steps for determining weight factors of antenna beams.

Let us next describe method steps for determining weight factors of antenna beams by means of FIG. 4. The method aims at achieving a power balance within predetermined limits between different antenna elements. It is most preferable to have a perfect power balance, but it is not always possible to accomplish it in order to achieve other set objects usually defined by how the radio network planning has succeeded. A first preferred embodiment of the method according to the invention is described first, other preferred embodiments thereafter. Different embodiments of the method are marked with a broken line and arrows 410, 412 in FIG. 4. To establish a radio link, the method employs one or more directional antenna beams implemented with an antenna array. The antenna beams are formed by using a known digital or analogue beam forming method. A radio cell refers to a radio cell according to a UMTS system, for instance, the cell having its own primary common pilot which is multiplied by a scrambling code in order to be transmitted to a channel. The radio cell is also often called an antenna sector or sector. A user-specific beam refers to a radio link allocated to each user. In the UMTS system, a radio channel of each user is separated from other radio channels by user-specific codes in accordance with code division multiple access CDMA. In the UMTS system, for example, each cell has its own scrambling code, by which user-specific signals are also multiplied.

The method starts in block 400. According to an embodiment of the invention, a radio cell is formed with an antenna beam, block 402. Next, in block 404, the radio cell is split into at least two different cells by splitting the antenna beam. Into how many parts the radio cell is split depends on the need and application, such as on the number of antenna elements.

FIGS. 5A and 5B illustrate an example of splitting a radio cell or an antenna beam into two parts. FIG. 5A shows an antenna beam 502 formed with an antenna array 500. The antenna beam is formed with a known beam forming method. FIG. 5B illustrates how the antenna beam is split into two antenna beams 504, 506. It is previously known how an antenna beam formed with the Butler matrix is split into two.

In this embodiment, the process next advances, as shown by arrow 412, to block 408 where weight factors of antenna elements of the antenna array are selected such that the antenna element specific sums of weight factors of the radio cell formed with the antenna array and corresponding weight factors of at least one, second radio cell formed with the same antenna array are at least substantially equal within predetermined limits in order to achieve a predetermined power balance between different antenna elements. The limits for the similarity of antenna element specific sums are defined by the objects of the radio network planning. These objects include desired beam directivity, crosstalk minimization, desired attenuation between different beams and required traffic capacity, such as number of channels. It is most preferable that the sums are as equal as possible, but in some cases exceptions have to be made to achieve the objects of the radio network planning.

Figure 7:
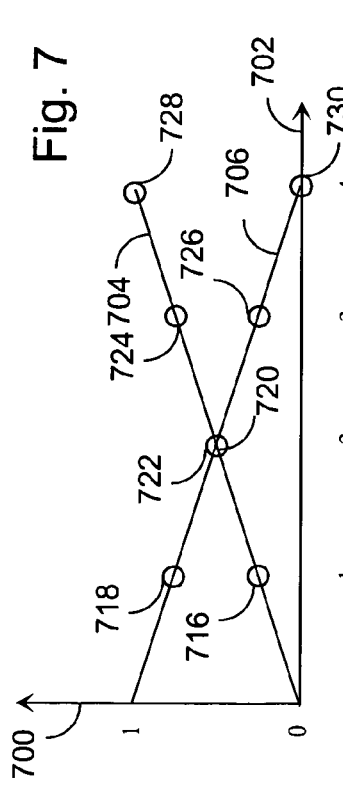
FIG. 7 illustrates an example of determining amplitude values for weight factors.

FIG. 7 illustrates an example of how to select the weight factors, particularly the amplitudes thereof, for antenna beams formed by dividing so that the sums of the corresponding weight factors are at least substantially equal. The system comprises two beams or radio cells. By selecting the weight factors so that in each radio cell or antenna beam separately, the sums of weight factors of each antenna element obtain the same value within the given range of variation, it is possible to have the desired power balance between different antenna elements, i.e. equal powers of different antenna elements within the desired limits. In the figure, amplitude values for the weight factors are shown on the vertical axis 700 and different antennas 708, 710, 712, 714 are on the horizontal axis 702. A straight line 704 illustrates amplitude values for the weight factors of a first radio cell or antenna beam, and a straight line 706 illustrates amplitude values for the weight factors of a second radio cell or antenna beam. The number of antenna elements of the antenna array may in different applications differ from what is stated above.

FIG. 7 shows that the sum of weight factor amplitudes 716 and 718 of the element 708, the sum of weight factor amplitudes 720 and 722 of the element 710, the sum of weight factor amplitudes 724 and 726 of the element 712 and the sum of weight factor amplitudes 728 and 730 of the element 714 obtain the same value within the selected limits. In accordance with the figure, the sum of the weight factor amplitudes 716 and 718 of the element 708 is 0.25+0.75=1, the sum of the weight factor amplitudes 720 and 722 of the element 710 is 0.5+0.5=1, the sum of the weight factor amplitudes 724 and 726 of the element 712 is 0.75+0.25=1 and the sum of the weight factor amplitudes 728 and 730 of the element 714 is 1+0=1. Thus, all sums in this example obtain the value 1.

The antenna element specific sums of the corresponding weight factors need not have exactly the same value, but, in order to achieve the objects set by radio planning, a range of variation can be set for the variation of sum expression values. Likewise, the amplitude values do not need to increase or decrease linearly, as in FIG. 7, but the values can also follow another graph shape. In a digital application, the values typically differ from each other by a specific stepping. The magnitude of a step is determined by the bit number defined for the weight factors: if the amplitudes of the weight factors are expressed with three bits, the resolution, i.e. the magnitude of a step, is 0.125, i.e. ⅛.

It is to be noted that by determining the weight factors of antenna elements as described above, the object is to achieve a power balance between different antenna elements within the limits set by the selected objects of radio planning. Because of the large number of variables, it is usually difficult to solve the problem analytically, and thus, in practice, the weight factors are usually selected by numerical checking.

In the following, a second preferred embodiment of the method according to the invention is explained. The method starts in block 400. As arrow 410 shows, the process next advances to block 406, where the antenna beam is split into at least two user-specific beams. Into how many beams the user-specific beam is split, depends on the need and application, such as on the number of antenna elements. In block 408, the weight factors of the antenna elements of the antenna array are selected so that the antenna element specific sums of the weight factors of the antenna elements of the user-specific beam and the corresponding weight factors of other user-specific beams formed with the same antenna array are at least substantially equal within predetermined limits in order to achieve a predetermined power balance between different antenna elements. The antenna beam splitting and the weight factor determination are described above by means of FIGS. 5A to 5B and 7.

A third preferred embodiment of the method according to the invention is a combination of the two previous embodiments. The method starts in block 400. A radio cell is formed in block 402. In block 404, the radio cell is split into at least two different cells by splitting an antenna beam. In block 406, the radio cell (i.e. the antenna beam) is split into at least two user-specific beams. How many cells or user-specific beams are achieved by splitting, depends on the need and application, such as on the number of antenna elements. In block 408, weight factors of antenna elements of the antenna array are selected such that the sums of the corresponding weight factors of (user-specific and other) beams formed with the same antenna array are at least substantially equal within predetermined limits in order to achieve a predetermined power balance. It is to be noted that if the system is a UMTS system, for instance, channelisation codes can be reused, owing to the splitting of different user-specific beams, e.g. if the user-specific beams are split into two, multiplexing codes or a required number of multiplexing codes in use can be reused once.

The antenna beam splitting and the weight factor determination are described above by means of FIGS. 5A to 5B and 7.

The methods end in block 414. Arrow 416 illustrates the repeatability of different embodiments of the method, which means that the dividing of radio cells or user-specific beams and the selection of weight factors can be performed at desired intervals again, for instance as the number of service users changes. If the number of users increases, one or more cells or user-specific beams can be divided into two or more parts, depending on the application and need. If the number of users decreases, one or more divided cell or user-specific beam can be combined. A soft handover makes it also possible to transmit to the same user equipment by using two antenna beams.

Objects of radio network planning, by which weight factors are determined to form antenna beams, typically include cell number required for providing a desired coverage or services, antenna gain, transmission power, beam width, crosstalk between different cells or beams, attenuation between different cells or beams, or beam directivity.

In the following, an example of a prior art digital baseband beam forming is explained in greater detail by means of FIG. 6. In the figure, baseband-frequency parts are located in a baseband block 614 and radio-frequency parts are located in a radio-frequency block 616. The output of block 600 is, for instance, a QPSK-modulated signal which is split into two parts: in the figure, x refers to the in-phase component of the signal and y refers to the quadrature component of the signal, which means that the modulated signal has the form x+jy. The modulated signal has complex weight factors to be used in antenna beam forming and having the form $W_I + jW_Q$. The in-phase component, i.e. the real component x of the modulated signal is multiplied in a complex multiplier 602 by the in-phase component of the weight factor. The quadrature component, i.e. the imaginary component y of the modulated signal is multiplied in a complex multiplier 604 by the quadrature component of the weight factor.

The complex baseband output signal of block 614 can be expressed in the form $$S_{BB}(t) = A(t)\exp[j(\omega t - \phi)] \qquad (1)$$
$$= A(t)\cos(\omega t - \phi) + jA(t)\sin(\omega t - \phi)$$
$$= C_I + jC_Q,$$

where
$A(t)$=signal amplitude as a function of time,
$t$=time
$\omega = 2\pi f$=angular frequency of the signal,
$f$=signal frequency,
$\phi$=phase angle of the signal,
exp refers to the exponential function,
$j^2 = -1$,
$C_I$ refers to the in-phase component of the signal,
$C_Q$ refers to the quadrature component of the signal.

The output signal of the baseband block 614 is supplied to complex multipliers 606, 608 of the radio-frequency block 616, where the baseband in-phase and quadrature signal components are multiplied by corresponding carrier-frequency components having the form $\cos(2\pi f_c t - \phi_c)$ and $\sin(2\pi f_c t - \phi_c)$, where $2\pi f_c = \omega_C$ is the angular frequency of the carrier wave, $\phi_C$ is the phase angle of the carrier wave, and the amplitude of the carrier wave is assumed to be unity. The radio-frequency carrier wave comprising both the in-phase and the quadrature component can thus be expressed in the form $$S_C = \exp[j(\omega_C t - \phi_C)], \qquad (2)$$

where
$\omega_C = 2\pi f_C$=angular frequency of the carrier wave,
$f_C$=carrier wave frequency,
$\phi_C$=phase angle of the carrier wave,
exp refers to the exponential function,
$j^2 = -1$,
$t$=time,
the amplitude of the carrier wave is assumed to be unity.

Next, the signal components (in-phase and quadrature components) are combined with a combiner 610.

The signal up-converted by the signal of formula (2) has the form $$S_{RF} = S_{BB}(t)\exp[j(\omega_c t - \phi_c)] \qquad (3)$$
$$= A(t)\exp[j(\omega t - \phi) + j(\omega_c t - \phi_c)],$$
$$= A(t)\exp[j(\omega + \omega_c)t - j(\phi + \phi_c)]$$

where
$\omega_C = 2\pi f_C$=angular frequency of the carrier wave,
$f_c$=carrier wave frequency,
$\phi_c$=phase angle of the carrier wave,
exp refers to the exponential function,
$j^2 = -1$,
$t$=time,
$\omega = 2\pi f$=angular frequency of the modulated signal,
$\phi$=angle phase of the modulated signal.

Formula (3) shows that the phase change in the baseband signal $S_{BB}$ can be seen as the same phase change in the phase of the signal to be transmitted $S_{RF}$.

The signal $S_{RF}$ is supplied to a power amplifier 612 to be amplified to a desired transmission power, and it is supplied to the antenna (not shown in the figure).

It is to be noted that calibration is required, if the beam forming is performed at the baseband frequency and if also the radio-frequency signals of different antennas are made to maintain phase differences of the baseband signals between different antenna elements of the antenna array. The beam forming can be performed digitally also by utilizing intermediate signals or analogically by utilizing radio-frequency signals.

The invention or its specific functions can be implemented, for example, by hardware solutions providing the required functionality, e.g. as ASIC (Application Specific Integrated Circuit), by utilizing separate logic components, or programmatically.

Figure 8A:
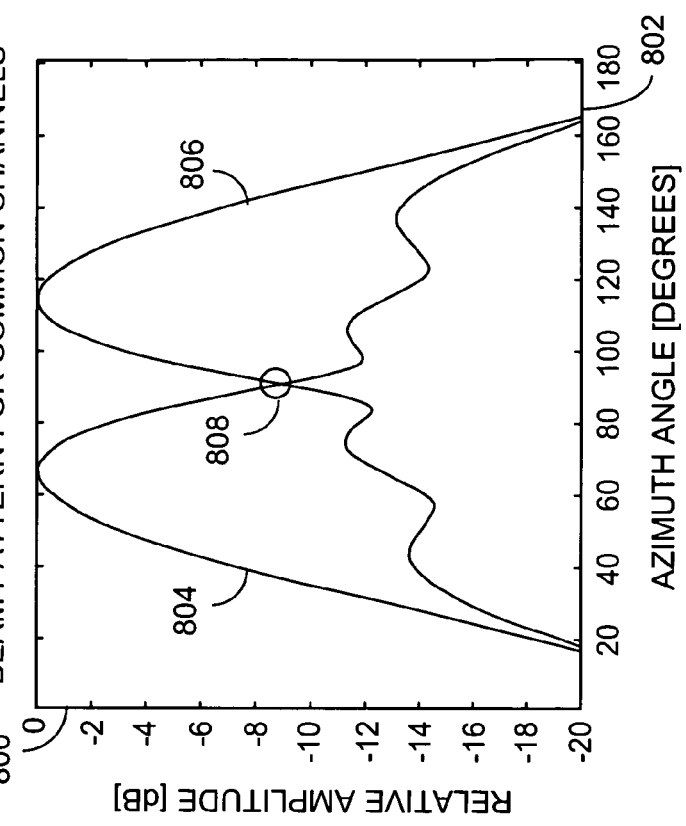
FIGS. 8a and 8b show an example of simulation results.
Figure 8B:
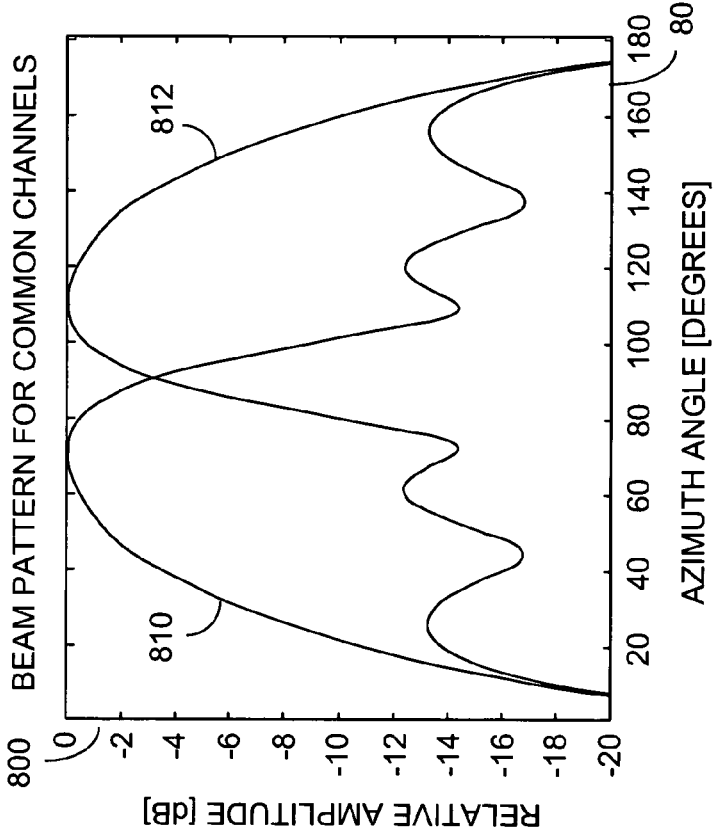

In the following, it is explained by means of simulation examples of FIGS. 8A to 8B in greater detail, how, by selecting weight factors, the objects of radio planning are achieved. In FIGS. 8A to 8B, the relative amplitude is expressed in decibels on the vertical axis 800 and the azimuth angle is expressed in degrees on the horizontal axis 802.

In FIG. 8A, a beam implemented with an antenna array is split into two beams 804 and 806. Four antenna elements of the antenna array obtain weight factors in the following manner: the first beam 804 is formed with the amplitude values 0.25, 0.5, 0.75 and 1 of the weight factors and the second beam 806 is formed with the amplitude values 1, 0.75, 0.5 and 0.25 of the weight factors. The figure shows that the isolation between different cells, i.e. beams, is remarkably good. In the example, the particular object of the radio planning is good isolation between different cells, i.e. the desired decibel level at point 808.

In FIG. 8B, a beam implemented with an antenna array is split into two beams 810 and 812. Four antenna elements of the antenna array obtain weight factors in the following manner: the first beam 810 is formed with the amplitude values 0.125, 0.25, 0.875 and 1 of the weight factors and the second beam 812 is formed with the amplitude values 1, 0.875, 0.25 and 0.125 of the weight factors. In this example, the object of the radio planning is as low an energy as possible from one beam to another, which means that there is as little crosstalk between the beams as possible.

In the simulation examples described above, the antenna array comprises four antenna elements, in which case there are also four complex factors. If the antenna array comprises more, e.g. eight, antenna elements, there are also eight complex factors.

Although the invention has been described above with reference to the example according to the attached drawings, it is obvious that the invention is not restricted thereto, but may be modified in a variety of ways within the scope of the inventive idea disclosed in the attached claims.

The invention claimed is:

1. A method for determining weight factors of antenna beams, the method comprising:
   using at least one directional antenna beam implemented with an antenna array to establish a radio link,
   forming a radio cell with the antenna beam,
   dividing the radio cell into at least two different cells by dividing the antenna beam, and
   selecting weight factors of antenna elements of the antenna array such that the antenna element specific sums of weight factors of a radio cell formed with the antenna array and corresponding weight factors of at least one, second radio cell formed with the same antenna array are at least substantially equal within predetermined limits in order to achieve a predetermined power balance between different antenna elements.

2. A method for determining weight factors of antenna beams, the method comprising:
   using at least one directional antenna beam implemented with an antenna array to establish a radio link,
   dividing the antenna beam into at least two user-specific beams, and
   selecting weight factors of antenna elements of the antenna array such that the antenna element specific sums of weight factors of antenna elements of a user-specific beam and corresponding weight factors of other user-specific beams formed with the same antenna array are at least substantially equal within predetermined limits in order to achieve a predetermined power balance between different antenna elements.

3. A method for determining weight factors of antenna beams, the method comprising:
   using at least one directional antenna beam implemented with an antenna array to establish a radio link,
   forming a radio cell with the antenna beam,
   dividing the radio cell into at least two different cells by dividing the antenna beam,
   dividing at least one antenna beam forming a radio cell into at least two user-specific beams, and
   selecting weight factors of antenna elements of the antenna array such that the antenna element specific sums of corresponding weight factors of beams formed with the same antenna array are at least substantially equal within predetermined limits in order to achieve a predetermined power balance between different antenna elements.

4. A method as claimed in claim 1, wherein the desired beam directivity is taken into account when predetermined limits are set for the antenna element specific sums.

5. A method as claimed in claim 1, wherein the minimization of crosstalk produced in another cell is taken into account when predetermined limits are set for the antenna element specific sums.

6. A method as claimed in claim 1, wherein the desired attenuation between different radio cells is taken into account when predetermined limits are set for the antenna element specific sums.

7. A method as claimed in claim 1, wherein the achieving of the necessary capacity in the desired geographical area is taken into account when predetermined limits are set for the antenna element specific sums.

8. A method as claimed in claim 1, wherein the weight factors of the antenna elements of the antenna array are selected by numerical estimation.

9. A method as claimed in claim 1, wherein the weight factors of the antenna elements of the antenna array are selected by analytical examination.

10. A method as claimed in claim 3, wherein a primary common pilot (PCPICH) according to the WCDMA system is transmitted to the radio cell and a separate secondary common pilot (SCPICH) according to the WCDMA system is transmitted to each user-specific beam.

11. A method as claimed in claim 1, wherein the antenna beams are formed by an analogue beam forming method.

12. A method as claimed in claim 1, wherein the antenna beams are formed by a digital beam forming method.

13. A method as claimed in claim 1, wherein the weight factors are complex.

14. A method as claimed in claim 2, wherein a different scrambling code is used in one or more user-specific beams.

15. A method as claimed in claim 1, wherein the power balance is as equal as possible.

16. A transmitter for determining weight factors of antenna beams, in which transmitter at least one directional antenna beam implemented with an antenna array is used to establish a radio link and a radio cell is formed with the antenna beam, comprising:
- means for dividing the radio cell into at least two cells by dividing the antenna beam and
- means for selecting weight factors of antenna elements of the antenna array such that the antenna element specific sums of weight factors of a radio cell formed with the antenna array and corresponding weight factors of at least one, second radio cell formed with the same antenna array are at least substantially equal within predetermined limits in order to achieve a predetermined power balance between different antenna elements.

17. A transmitter for determining weight factors of antenna beams, in which transmitter at least one directional antenna beam implemented with an antenna array is used to establish a radio link, comprising:
- means for dividing the antenna beam into at least two user-specific beams, and
- means for selecting weight factors of antenna elements of the antenna array such that the antenna element specific sums of weight factors of antenna elements of a user-specific beam and corresponding weight factors of other user-specific beams formed with the same antenna array are at least substantially equal within predetermined limits in order to achieve a predetermined power balance between different antenna elements.

18. A transmitter for determining weight factors of antenna beams, in which transmitter at least one directional antenna beam implemented with an antenna array is used to establish a radio link and a radio cell is formed with the antenna beam, comprising:
- means for dividing the radio cell into at least two different cells by dividing the antenna beam,
- means for dividing the antenna beam forming a radio cell into at least two user-specific beams, and
- means for selecting weight factors of antenna elements of the antenna array such that the antenna element specific sums of corresponding weight factors of beams formed with the same antenna array are at least substantially equal within predetermined limits in order to achieve a predetermined power balance between different antenna elements.

19. A transmitter as claimed in claim 17, wherein the desired beam directivity is taken into account when predetermined limits are set for the antenna element specific sums.

20. A transmitter as claimed in claim 17, wherein the minimization of crosstalk produced in the second cell is taken into account when predetermined limits are set for the antenna element specific sums.

21. A transmitter as claimed in claim 17, wherein the desired attenuation between different radio cells is taken into account when predetermined limits are set for the antenna element specific sums.

22. A transmitter as claimed in claim 17, wherein the defined capacity in the desired geographical area is taken into account when predetermined limits are set for the antenna element specific sums.

23. A transmitter as claimed in claim 17, wherein the weight factors of the antenna elements of the antenna array are selected by numerical estimation.

24. A transmitter as claimed in claim 18, wherein the weight factors of the antenna elements of the antenna array are selected by analytical observation.

25. A transmitter as claimed in claim 18, wherein a primary common pilot (PCPICH) according to the WCDMA system is transmitted to the radio cell and a separate secondary common pilot (SCPICH) according to the WCDMA system is transmitted to each user-specific beam.

26. A transmitter as claimed in claim 18, wherein the antenna beams are formed by an analogue beam forming method.

27. A transmitter as claimed in claim 18, wherein the antenna beams are formed by a digital beam forming method.

28. A transmitter as claimed in claim 18, wherein the weight factors are complex.

29. A transmitter as claimed in claim 18, wherein a different scrambling code is used in one or more user-specific beams.

30. A transmitter as claimed in claim 18, wherein the power balance is as equal as possible.

31. A transmitter for determining weight factors of antenna beams, in which transmitter at least one directional antenna beam implemented with an antenna array is used to establish a radio link and a radio cell is formed with the antenna beam, comprising:
- dividing means dividing the radio cell into at least two cells by dividing the antenna beam, and
- selecting means selecting weight factors of antenna elements of the antenna array such that the antenna element specific sums of weight factors of a radio cell formed with the antenna array and corresponding weight factors of at least one, second radio cell formed with the same antenna array are at least substantially equal within predetermined limits in order to achieve a predetermined power balance between different antenna elements.

32. A transmitter for determining weight factors of antenna beams, in which transmitter at least one directional antenna beam implemented with an antenna array is used to establish a radio link, comprising:
- dividing means dividing the antenna beam into at least two user-specific beams, and
- selecting means selecting weight factors of antenna elements of the antenna array such that the antenna element specific sums of weight factors of antenna elements of a user-specific beam and corresponding weight factors of other user-specific beams formed with the same antenna array are at least substantially equal within predetermined limits in order to achieve a predetermined power balance between different antenna elements.

33. A transmitter for determining weight factors of antenna beams, in which tranmsitter at least one directional antenna beam implemented with an antenna array is used to establish a radio link and a radio cell is formed with the antenna beam, comprising:
- first dividing means dividing the radio cell into at least two different cells by dividing the antenna beam, second dividing means dividing the antenna beam forming a radio cell into at least two user-specific beams, and selecting means selecting weight factors of antenna elements of the antenna array such that the antenna element specific sums of corresponding weight factors of beams fonned with the same antenna array are at least substantially equal within predetermined limits in order to achieve a predetermined power balance between different antenna elements.

* * * * *